United States Patent
Okayama

(10) Patent No.: US 11,296,943 B2
(45) Date of Patent: Apr. 5, 2022

(54) INFORMATION PROCESSING APPARATUS, CONTROL METHOD FOR INFORMATION PROCESSING APPARATUS, AND RECORDING MEDIUM

(71) Applicant: CANON KABUSHIKI KAISHA, Tokyo (JP)

(72) Inventor: Noritsugu Okayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 228 days.

(21) Appl. No.: 16/055,578

(22) Filed: Aug. 6, 2018

(65) Prior Publication Data

US 2018/0351807 A1    Dec. 6, 2018

Related U.S. Application Data

(63) Continuation of application No. 14/880,811, filed on Oct. 12, 2015, now Pat. No. 10,075,340.

(30) Foreign Application Priority Data

Oct. 14, 2014    (JP) ................... 2014-209795

(51) Int. Cl.
  *G06F 9/46*        (2006.01)
  *H04L 41/08*       (2022.01)
  *G06F 9/445*       (2018.01)
  *G06F 9/4401*      (2018.01)

(52) U.S. Cl.
  CPC ...... *H04L 41/0883* (2013.01); *G06F 9/44505* (2013.01); *G06F 9/4416* (2013.01)

(58) Field of Classification Search
  CPC ......... G06F 9/4881; G06F 9/485; G06F 9/546
  See application file for complete search history.

(56) References Cited

U.S. PATENT DOCUMENTS

| | | | | |
|---|---|---|---|---|
| 6,356,585 | B1* | 3/2002 | Ko | H04L 1/0001 370/485 |
| 2006/0048025 | A1* | 3/2006 | Filipovic | G05B 23/0264 714/724 |
| 2007/0157266 | A1* | 7/2007 | Ellis | H04N 21/4325 725/89 |
| 2007/0256058 | A1* | 11/2007 | Marfatia | G06F 8/51 717/137 |

(Continued)

FOREIGN PATENT DOCUMENTS

JP    2005-38408 A    2/2005

*Primary Examiner* — Camquy Truong
(74) *Attorney, Agent, or Firm* — Canon U.S.A., Inc. IP Division

(57) ABSTRACT

An information processing apparatus includes a management unit configured to manage configuration information indicating a device configuration of the information processing apparatus, a receiving unit configured to receive setting information to be used by the information processing apparatus to perform an operation, from a server, and a control unit configured to control, in a case where setting information stored in the information processing apparatus is updated by using the received setting information, whether to execute processing for causing the information processing apparatus to reflect the update of the setting information, based on a type of the setting information to be updated and the configuration information.

24 Claims, 13 Drawing Sheets

(56) References Cited

U.S. PATENT DOCUMENTS

| | | | |
|---|---|---|---|
| 2007/0288916 A1* | 12/2007 | Harada | G06F 9/4411 |
| | | | 717/174 |
| 2012/0124568 A1* | 5/2012 | Fallon | G06F 9/453 |
| | | | 717/169 |
| 2012/0191414 A1* | 7/2012 | Takiguchi | G07C 3/02 |
| | | | 702/182 |
| 2012/0317259 A1* | 12/2012 | Shikano | H04L 12/00 |
| | | | 709/223 |
| 2017/0277530 A1* | 9/2017 | Adams | G06F 8/654 |

* cited by examiner

| SETTING DATA NAME | DATA TYPE | VALUE |
|---|---|---|
| IP ADDRESS SETTING | string | aaa.bbb.ccc.ddd |
| DHCP SETTING | boolean | OFF |
| REMOTE OPERATION SETTING | boolean | ON |
| FAX TRANSMISSION LINE SETTING | boolean | TONE |
| SCANNER SETTING DENSITY ADJUSTMENT [%] | ushort | 7 |
| DISPLAY LANGUAGE SETTING | string | "ja" |
| NUMBER OF COPIES [COPIES] | ushort | 1 |

FIG. 6B

| 530 SETTING DATA NAME | REFLECTION BUTTON TARGET | RELEVANT OPTION | RELEVANT OPTION PRESENCE | RELEVANT OPTION ABSENCE |
|---|---|---|---|---|
| IP ADDRESS SETTING | TARGET | OPTION IMAGE PROCESSING CONTROLLER | REBOOT BUTTON | SETTING REFLECTION BUTTON |
| DHCP SETTING | TARGET | OPTION IMAGE PROCESSING CONTROLLER | REFLECTION BUTTON UNNECESSARY | SETTING REFLECTION BUTTON |
| REMOTE OPERATION SETTING | TARGET | OPTION APPLICATION A | REBOOT BUTTON | SETTING REFLECTION BUTTON |
| FAX TRANSMISSION LINE SETTING | TARGET | MODEM | REBOOT BUTTON | REFLECTION BUTTON UNNECESSARY |
| SCANNER SETTING DENSITY ADJUSTMENT [%] | TARGET | SCANNER | REBOOT BUTTON | REFLECTION BUTTON UNNECESSARY |
| DISPLAY LANGUAGE SETTING | TARGET | NONE | REFLECTION BUTTON UNNECESSARY | REBOOT |
| NUMBER OF COPIES [COPIES] | NON-TARGET | NONE | REFLECTION BUTTON UNNECESSARY | REFLECTION BUTTON UNNECESSARY |

INFORMATION PROCESSING APPARATUS, CONTROL METHOD FOR INFORMATION PROCESSING APPARATUS, AND RECORDING MEDIUM

CROSS-REFERENCE TO RELATED APPLICATION

This application is a Continuation of U.S. application Ser. No. 14/880,811, filed Oct. 12, 2015, which claims priority from Japanese Patent Application No. 2014-209795, filed Oct. 14, 2014, which are hereby incorporated by reference herein in their entireties.

BACKGROUND

Technical Field

The present invention relates to an information processing apparatus, a control method for an information processing apparatus, and a recording medium.

Description of the Related Art

There are two types of setting data related to control of an information processing apparatus, e.g., an image formation apparatus. One type of setting data allows a change in the setting data to be activated immediately. The other type of setting data allows, after a change in the setting data is made, the change in the setting data to be activated by specific reflection processing. Japanese Patent Application Laid-Open No. 2005-38408 discusses a configuration of changing setting data, and then activating the changed setting data by rebooting an apparatus. Further, to call such specific reflection processing, a button for prompting a user to execute reboot is displayed on an operation unit panel of an image formation apparatus, and then setting data is actually activated by rebooting the image formation apparatus in response to the button pressed by the user.

SUMMARY

According to an aspect of the present invention, an information processing apparatus includes a management unit configured to manage configuration information indicating a device configuration of the information processing apparatus, a receiving unit configured to receive setting information to be used by the information processing apparatus to perform an operation, from a server, and a control unit configured to control, in a case where setting information stored in the information processing apparatus is updated by using the received setting information, whether to cause a display unit to produce display prompting execution of reboot processing that causes the information processing apparatus to reflect the update of the setting information, based on a type of the setting information to be updated and the configuration information.

Further features of the present invention will become apparent from the following description of exemplary embodiments with reference to the attached drawings.

BRIEF DESCRIPTION OF THE DRAWINGS

FIGS. 6A and 6B are diagrams each illustrating an example of data managed by an information processing apparatus.

DESCRIPTION OF THE EMBODIMENTS

Exemplary embodiments of the present invention will be described with reference to the drawings.

<Description of System Configuration>

Figure 1:
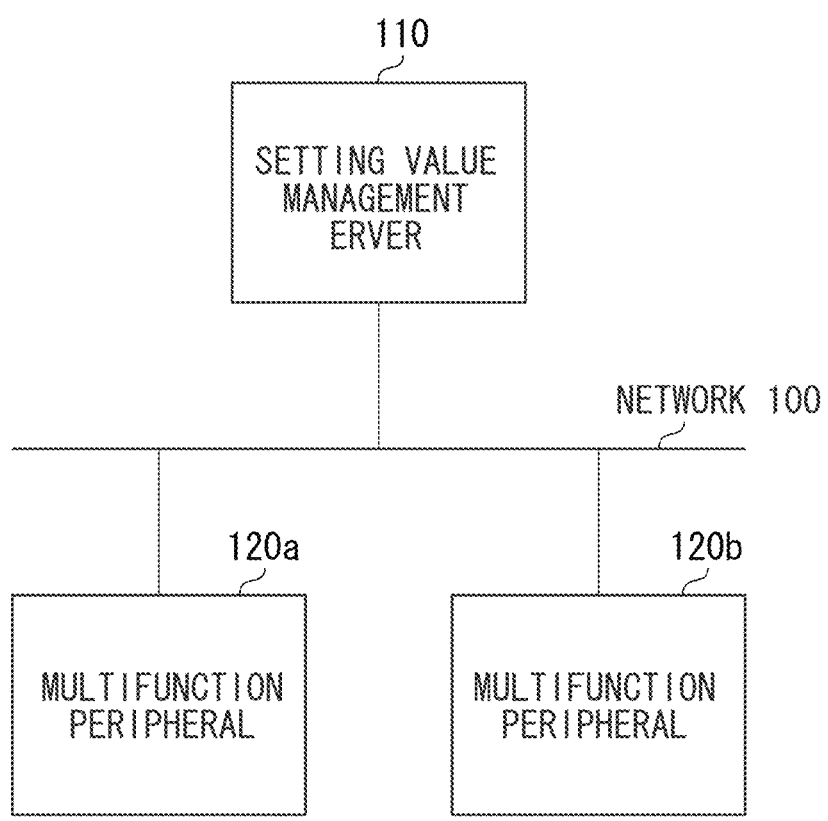
FIG. 1 is a block diagram of a management system to which a management apparatus is applied.

A first exemplary embodiment will be described below. FIG. 1 is a block diagram of a management system to which a management apparatus according to the present exemplary embodiment is applied. This is a system example in which the management apparatus is communicably connected to a plurality of information processing apparatuses via a network. In the present exemplary embodiment, a multifunction peripheral will be described as an example of the information processing apparatus.

In FIG. 1, a setting value management server 110 as well as multifunction peripherals 120a and 120b are connected to a network 100. The setting value management server 110 manages master data 500 (see FIG. 5) including setting values of each of the multifunction peripheral 120a and the multifunction peripheral 120b. If a change is made in the master data 500, the multifunction peripheral 120a or the multifunction peripheral 120b is notified of change information via the network 100. The present invention is also applicable to an image forming apparatus in place of the multifunction peripheral.

Further, when receiving setting-value change information from the multifunction peripheral 120a or the multifunction peripheral 120b, the setting value management server 110 changes a value in the master data 500. The multifunction peripherals 120a and 120b are each an information processing apparatus that implements a plurality of types of functions (such as copy and fax) and stores setting values to be used for execution of these functions. Furthermore, when a change is made in a setting value on the information processing apparatus side, the information processing apparatus notifies the setting value management server 110 of change information via the network 100. Meanwhile, when receiving information indicating a change in the setting value stored in the master data 500 from the setting value management server 110, the information processing apparatus changes a value representing the own setting value.

There are setting values for which value synchronization is necessary between the multifunction peripherals, e.g., between the multifunction peripheral 120a and the multifunction peripheral 120b. For such setting values, if a change occurs in the master data 500 on the setting value management server 110, both the multifunction peripheral 120a and the multifunction peripheral 120b are notified of setting-value change information.

If a change occurs in the setting value of either the multifunction peripheral 120a or the multifunction peripheral 120b, at first, the setting value management server 110 is notified of change information, and then, the other multifunction peripheral is also notified of change information via the setting value management server 110. Details of the setting value management server 110 as well as the multifunction peripherals 120a and 120b will be described below.

Figure 2:
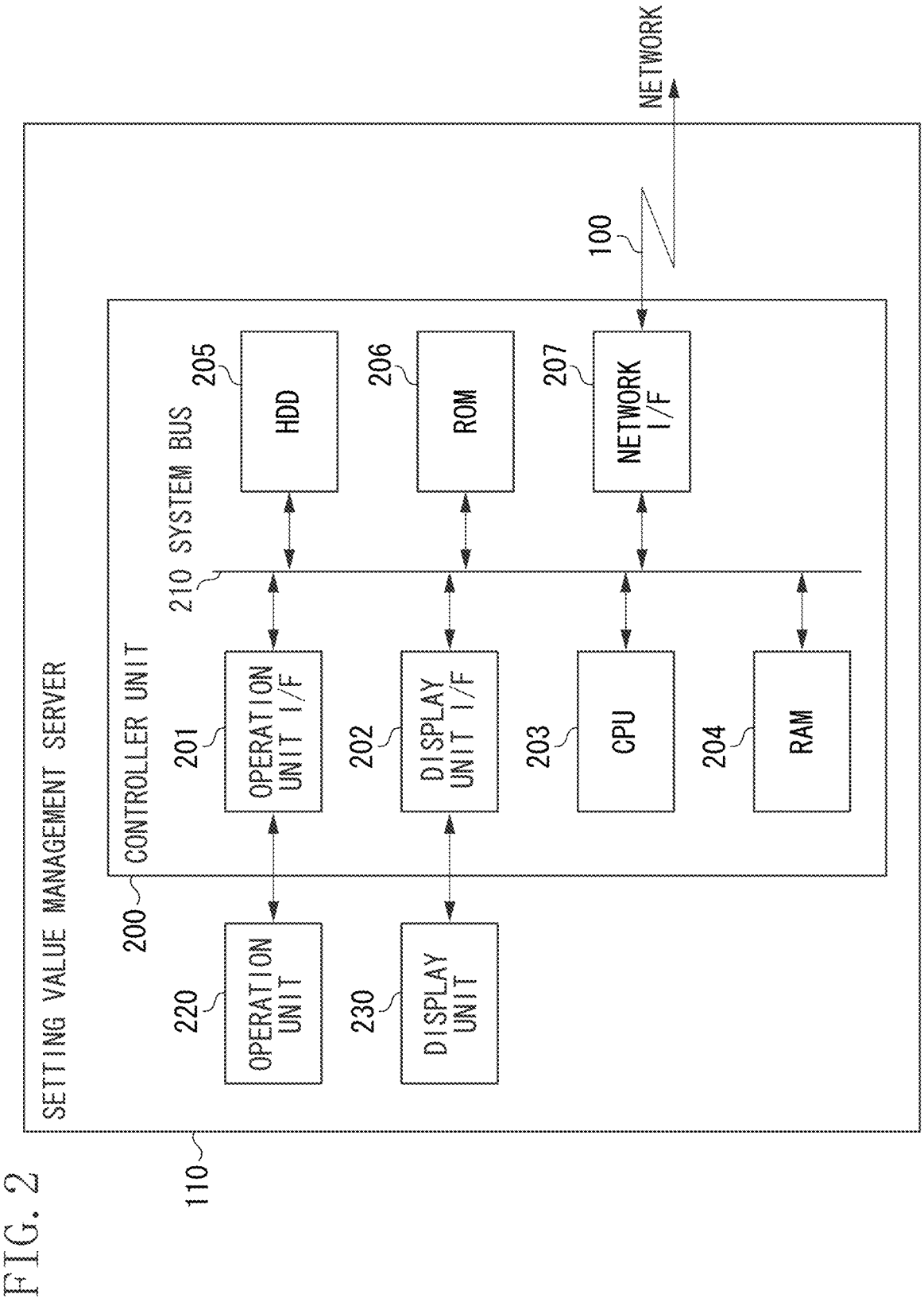
FIG. 2 is a block diagram illustrating a configuration of the management apparatus illustrated in FIG. 1.

FIG. 2 is a block diagram illustrating a configuration of the management apparatus illustrated in FIG. 1. This is an example in which the management apparatus is configured of the setting value management server 110.

In FIG. 2, the setting value management server 110 includes a controller unit 200, an operation unit 220, and a display unit 230. The controller unit 200 has a central processing unit (CPU) 203. The CPU 203 starts an operating system (OS) by executing a boot program stored in a read only memory (ROM) 206.

The CPU 203 executes an application program stored in a hard disk drive (HDD) 205 on the OS, thereby executing various kinds of processing. A random access memory (RAM) 204 is used as a work area of the CPU 203. The HDD 205 stores the above-described application program and the master data 500 of the setting values of the multifunction peripheral 120 (120a and 120b).

In addition to the ROM 206 and the RAM 204, an operation unit interface (I/F) 201, a display unit I/F 202, and a network I/F 207 are connected to the CPU 203 via a system bus 210.

The operation unit I/F 201 is an interface with the operation unit 220 including components such as a mouse and a keyboard. The operation unit I/F 201 sends out information input by a user through the operation unit 220 to the CPU 203. The display unit I/F 202 outputs image data to be displayed on the display unit 230 including components such as a display to the display unit 230.

Further, the network I/F 207 is connected to the network 100, and performs, via the network 100, input/output of information to/from apparatuses on the network 100.

Figure 3:
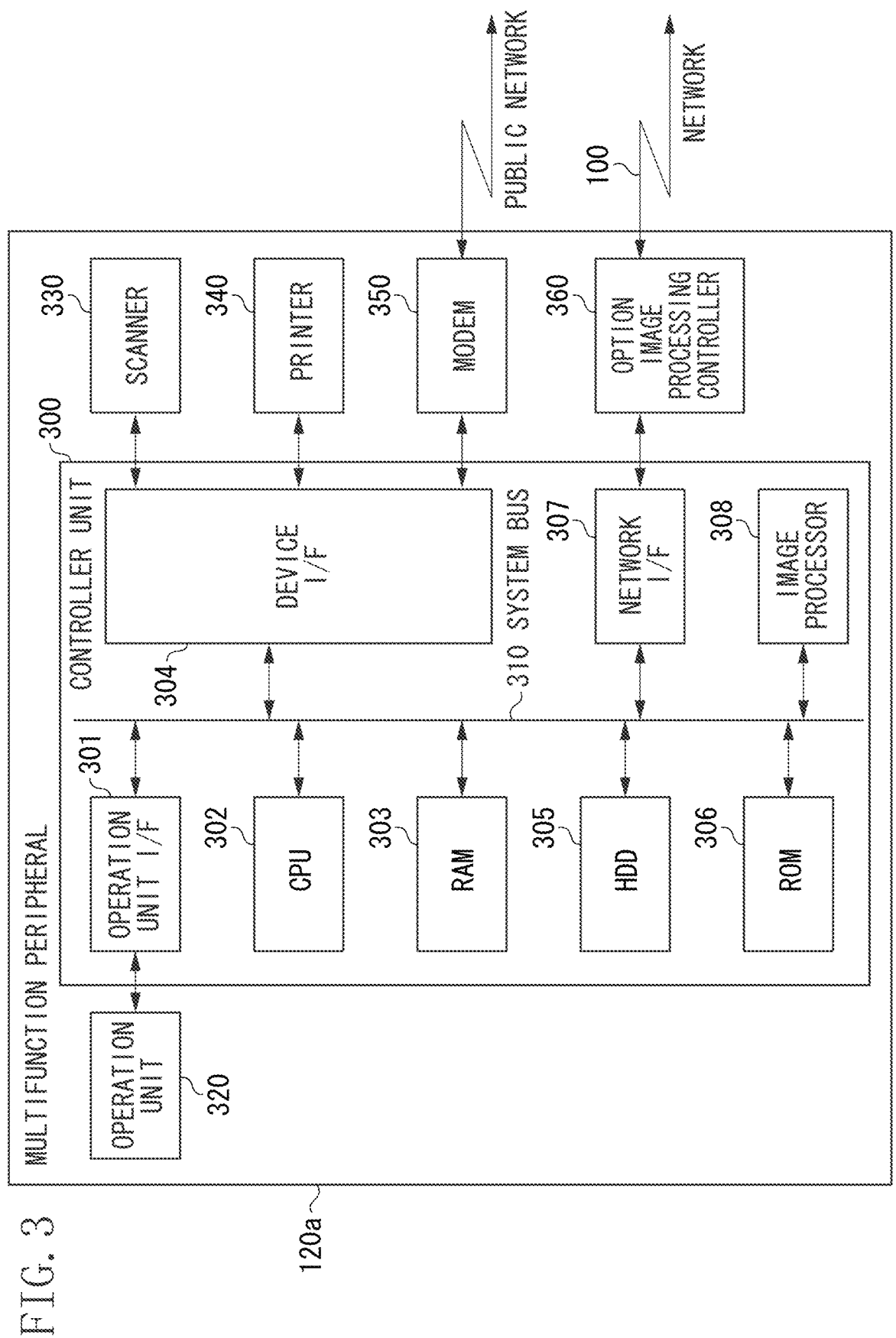
FIG. 3 is a block diagram illustrating a configuration of an information processing apparatus.

FIG. 3 is a block diagram illustrating a configuration of the information processing apparatus in the present exemplary embodiment. This is an example in which the information processing apparatus is configured as the multifunction peripherals 120a and 120b.

In FIG. 3, the multifunction peripheral 120a includes a controller unit 300, an operation unit 320, a scanner 330, a printer 340, a modulator-demodulator (MODEM) 350, and an option image processing controller 360.

The MODEM 350 is an additional option for allowing the multifunction peripheral 120a to perform fax communication. The optional image processing controller 360 is also an additional option, and provided to perform conversion on print data that is received and transmitted via the network 100. The multifunction peripheral 120a having a default configuration is not provided with these additional options.

The operation unit 320, the printer 340, the scanner 330, the MODEM 350, and the option image processing controller 360 are connected to the controller unit 300. The scanner 330 is an image input device, and the printer 340 is an image output device.

The controller unit 300 has a CPU 302. The CPU 302 starts an OS by executing a boot program stored in a ROM 306.

The CPU 302 executes an application program stored in a HDD 305 on the OS, thereby executing various kinds of processing. A RAM 303 is used as a work area of the CPU 302.

Further, besides providing the work area, the RAM 303 provides an image memory area for temporarily storing image data. The HDD 305 stores the above-described application program and image data, as well as various kinds of setting data. A method for managing the setting data in the multifunction peripheral 120a will be described below.

In addition to the ROM 306 and the RAM 303, an operation unit I/F 301, a device I/F 304, a network I/F 307, and an image processor 308 are connected to the CPU 302 via a system bus 310. The operation unit I/F 301 is an interface with the operation unit 320 having a touch panel and outputs image data to be displayed on the operation unit 320 to the operation unit 320.

Further, the operation unit I/F 301 sends out information input by a user through the operation unit 320 to the CPU 302. The scanner 330, the printer 340, and the MODEM 350 are connected to the device I/F 304, and the device I/F 304 performs synchronous/asynchronous conversion of image data. The network I/F 307 is connected to the network 100, and performs, via the network 100, input/output of information to/from apparatuses on the network 100. The image processor 308 performs processing such as processing an image input from the scanner 330, outputting an image to the printer 340, image rotation, image compression, resolution conversion, color space conversion, and tone conversion.

Figure 4:
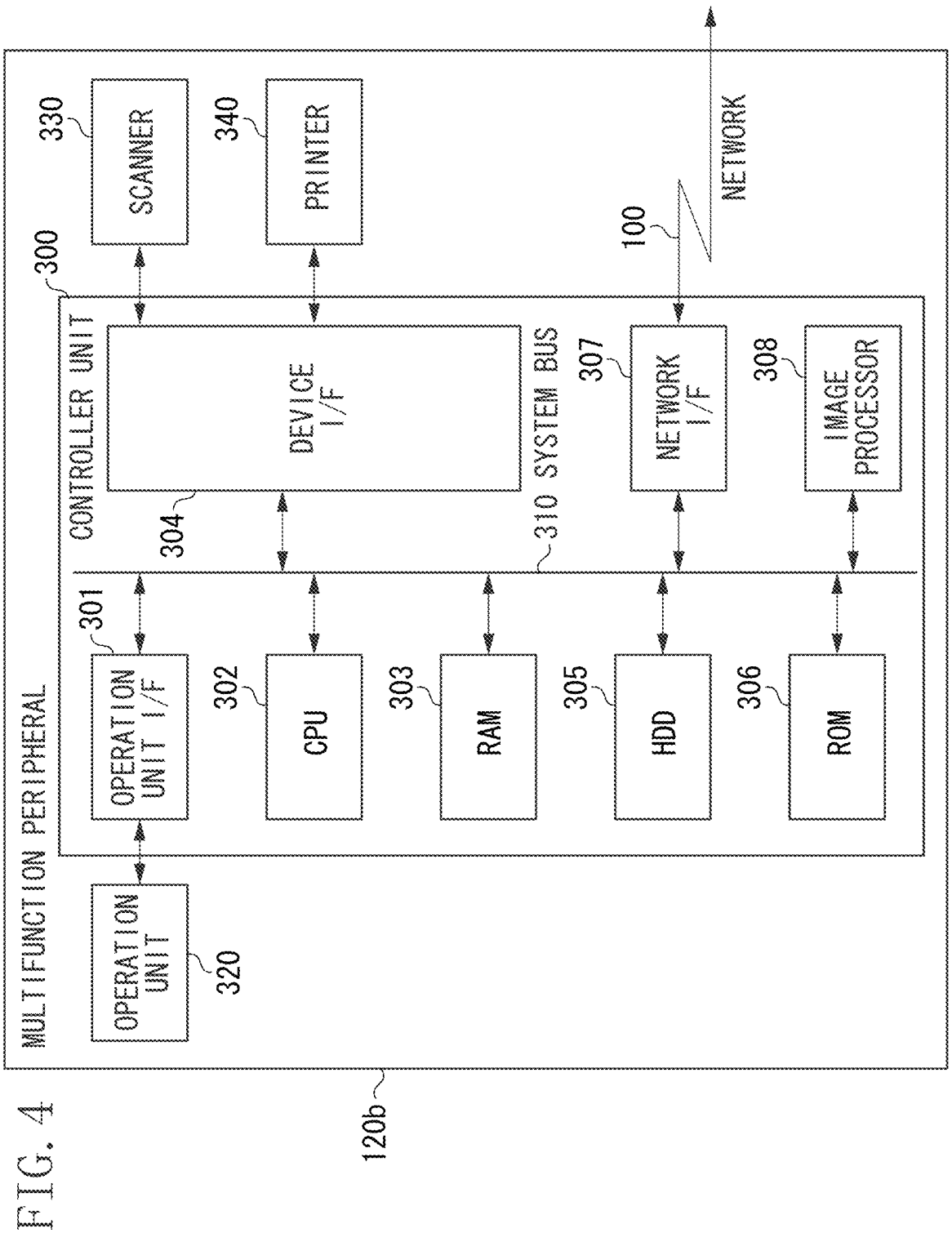
FIG. 4 is a block diagram illustrating a configuration of a multifunction peripheral illustrated in FIG. 1.

FIG. 4 is a block diagram illustrating a configuration of the multifunction peripheral 120b illustrated in FIG. 1. Unlike the multifunction peripheral 120a, the multifunction peripheral 120b is configured not to have the MODEM 350 and the option image processing controller 360 that are additional options.

Therefore, in FIG. 4, the multifunction peripheral 120b is not able to use a function of fax communication or a function of changing image data by using the option image processing controller 360.

Figure 5:
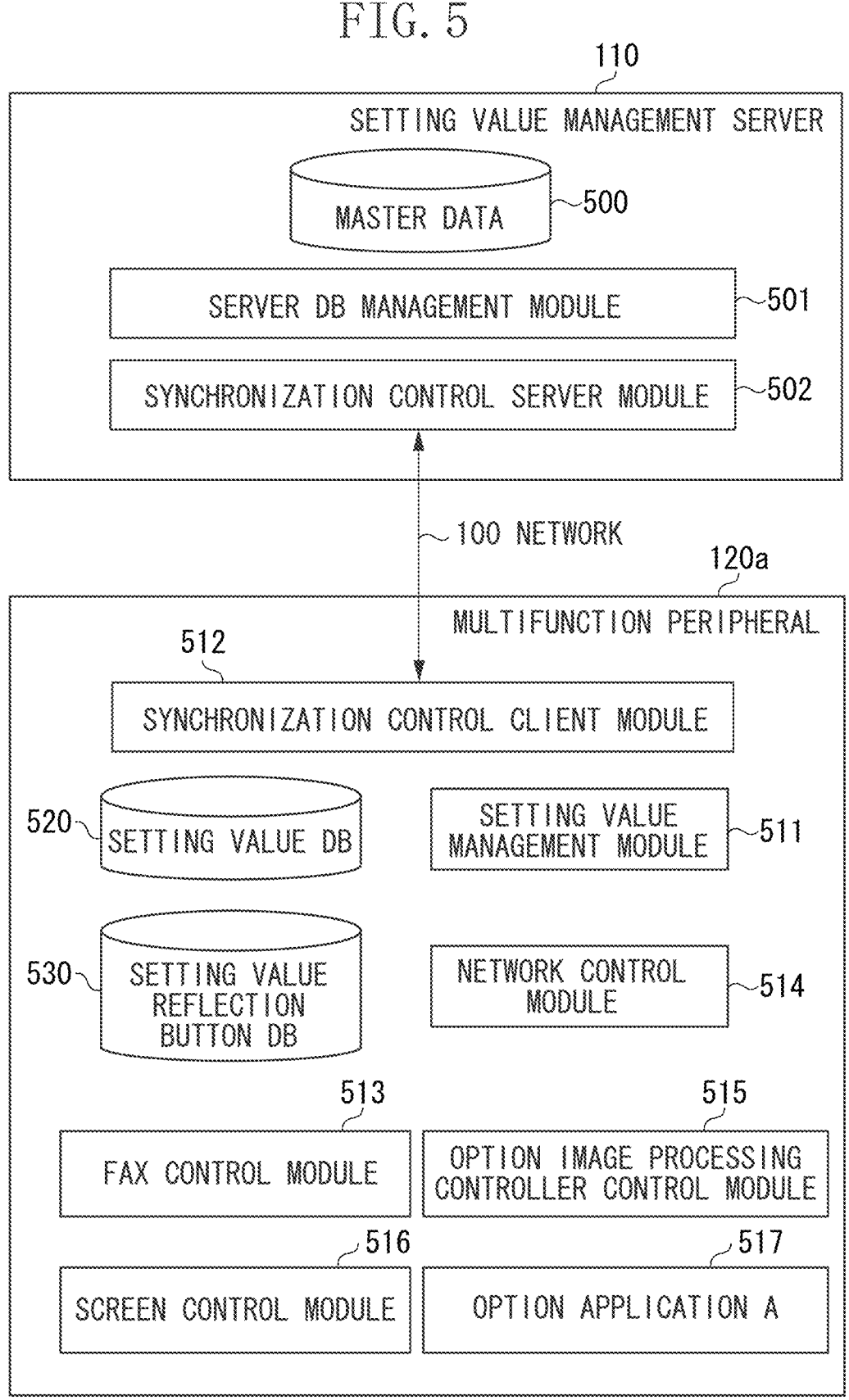
FIG. 5 is a diagram illustrating an example of a software module configuration of a management system.

FIG. 5 is a diagram illustrating an example of a software module configuration of the management system in the present exemplary embodiment. A software module configuration in the setting value management server 110 and the multifunction peripheral 120a illustrated in FIG. 1 will be described below as an example.

The setting value management server 110 illustrated in FIG. 5 includes a server database (DB) management module 501 for editing the master data 500, and all data is edited via this module. Browsing and editing of the data in the master DB can also be performed by providing a web application for accessing this module. A synchronization control server module 502 receives a request such as a data acquisition request and a change request from a client using the network 100, and provides an instruction for reading from or writing to the server DB management module 501.

On the other hand, a setting value DB 520 is provided in the multifunction peripheral 120a illustrated in FIG. 5, and reading and writing are performed via a setting value management module 511. The setting value management module 511 manages configuration information indicating a configuration of the information processing apparatus. Various kinds of setting data related to control of the multifunction peripheral 120a are stored in the setting value DB 520. Although not illustrated in FIG. 5, all application programs running on the multifunction peripheral 120a access data in the setting value DB 520 using the setting value management module 511. A synchronization control client module 512 communicates, via the network 100, with the synchronization control server module 502 in the setting value management server 110.

The synchronization control server module 502 mainly performs an operation for allowing the multifunction peripheral 120 to take in a server-side DB change by periodical polling, or for reflecting an update of the setting value DB 520 of the multifunction peripheral 120 to the master data 500 of the setting value management server 110. The synchronization control client module 512 receives, from the server (the setting value management server 110), setting information to be used by the information processing apparatus for its operation. The setting information to be received may be all of the setting information, or may be update information indicating updated content of the setting information managed by the server (i.e., a part of the setting information managed by the server). In the present exemplary embodiment, this series of operations, which include an operation for reflecting a change made in the setting value DB 520 to the master data 500 and an operation for detecting a change made in the master data 500 and reflecting the detected change to the setting value DB 520, is defined as synchronization control.

This synchronization control allows a change of the data in the setting value DB 520 of the multifunction peripheral 120a, by editing the master data 500 of the setting value management server 110. A fax control module 513 implements a fax communication function by controlling the MODEM 350. A network control module 514 is in charge of controlling the network I/F 307.

Further, an optional image processing controller control module 515 controls the option image processing controller 360. A screen control module 516 allows display on the panel of the operation unit 320 and acceptance of operation from a user, by controlling the operation unit 320. An option application A 517 is an additional application that is not installed in a default configuration. A setting value reflection button DB 530 stores relevant option information, and information necessary for reflecting changed setting-data, for each piece of the setting data in the setting value DB 520.

Next, an internal image of each of the setting value DB 520 and the setting value reflection button DB 530 will be described using FIGS. 6A and 6B.

FIG. 6A illustrates an example of the data managed in the setting value DB 520.

In FIG. 6A, a setting data name corresponding to the type of the setting data is a unique identification (ID) assigned to each piece of the setting data managed in the setting value DB 520. For example, the setting data indicated by a setting data name of "Dynamic Host Configuration Protocol (DHCP) setting" is referred to by the network control module 514. This setting data has a data type of "boolean", and a value of "OFF".

Figure 10A:
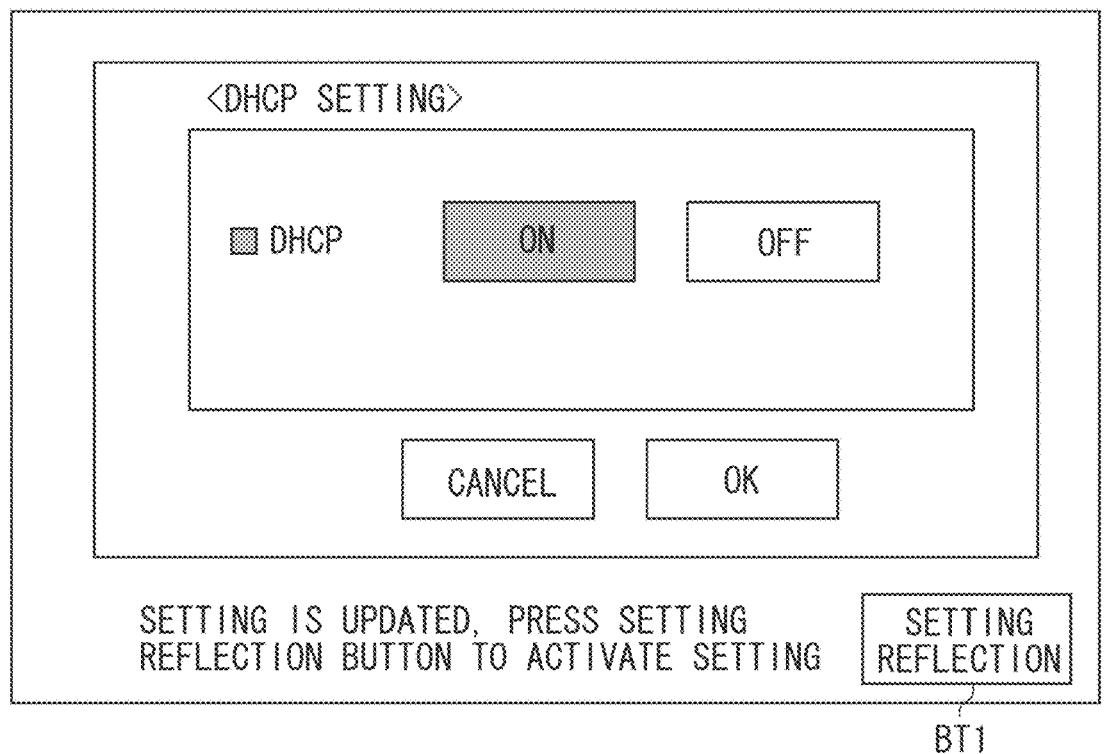
FIGS. 10A and 10B are diagrams each illustrating a user interface (UI) screen displayed on an operation unit.

Likewise, information indicating a setting data name, a data type, and a value is stored for each of other pieces of the setting data. In addition, the current value of each piece of the setting data can be edited on the setting value management server 110 or via the operation unit 320 by a user. For example, FIG. 10A is a display example when "DHCP setting" is edited on the panel of the operation unit 320. In a screen illustrated in FIG. 10A, a setting reflection button BT1 is displayed.

Next, FIG. 6B illustrates an example of the data managed in the setting value reflection button DB 530.

In FIG. 6B, the data in the setting value reflection button DB 530 is managed in association with the setting data managed in the setting value DB 520 using the same setting data name. For example, the setting data indicated by a setting data name of "scanner setting density adjustment" shows "target" in a reflection button target column.

This indicates that additional reflection processing may be necessary to activate the changed setting when the value of "scanner setting density adjustment" in the setting value DB 520 is changed. Further, a relevant option column indicates an option to be considered when the setting data is changed.

The setting data indicated by "scanner setting density adjustment" shows "scanner" in the relevant option column. This indicates that the setting data requires considering whether the scanner 330 is attached to the multifunction peripheral 120a. The setting data indicates "reboot button" in a relevant option presence column, and "reflection button unnecessary" in a relevant option absence column. This indicates as follows. When the scanner 330 is attached to the multifunction peripheral 120a, reboot processing using a reboot button is necessary to activate a change in the setting data of "scanner setting density adjustment". On the other hand, when the scanner 330 is not attached, the reflection button is unnecessary, i.e., the reboot processing is unnecessary, to reflect the setting data.

Figure 10B:
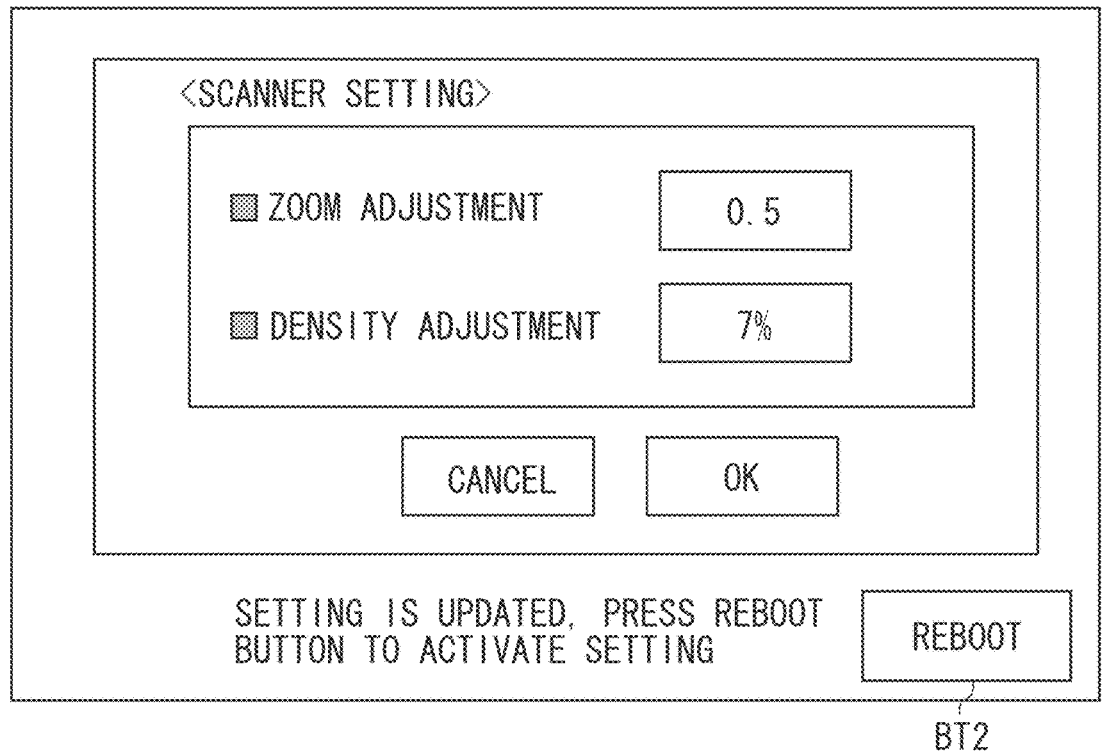

For example, FIG. 10B is a user interface (UI) screen example displayed on the operation unit 320 when "scanner setting density adjustment" is edited on the panel of the operation unit 320. If the scanner 330 is attached as in the multifunction peripheral 120a illustrated in FIG. 3, reboot is necessary to activate the setting data of "scanner setting density adjustment" according to the information of "reboot button" in the relevant option presence column in setting value reflection button information in the setting value reflection button DB 530 illustrated in FIG. 6B.

In FIG. 10B, since the setting data needs to be rebooted if a change is made, a reboot button BT2 for prompting a user to reboot the multifunction peripheral 120a is displayed in a lower part of the screen. Meanwhile, there is setting data indicated by a setting data name of "number of copies" shown in the information in the setting value reflection button DB530 illustrated in FIG. 6B. For this setting data, "non-target" is indicated in the reflection button target column. The setting data indicated as "non-target" in the reflection button target column represents the setting data that allows a change in this setting data to be reflected immediately, and specific additional processing is not necessary to reflect the change in the setting data.

Further, as illustrated in FIG. 6B, there is setting data indicated as "Internet Protocol (IP) address setting", which is information corresponding to a reflection button target. In this case, in order to activate a change made in the setting data in the setting value DB 520, the network control module 514 needs to additionally notify the network I/F 307 and the option image processing controller 360 of the change made in the setting value DB 520. Therefore, for this setting data "target" is indicated in the reflection button target column.

In addition, for the setting data corresponding to "IP address setting", "optional image processing controller" is indicated in the relevant option column. This indicates that, similarly to the "scanner setting density adjustment" described above, it is necessary to consider whether the option image processing controller 360 is attached to the target multifunction peripheral 120. When the optional image processing controller 360 is absent as in the multifunction peripheral 120b, setting-data change processing is performed based on information of "setting reflection button" in the relevant option absence column. For a setting data name of "fax transmission line setting", "MODEM" is indicated in the relevant option column. This similarly indicates that it is necessary to consider whether the MODEM 350 is attached to the target multifunction peripheral when the setting data is changed.

Further, for the setting data of "remote operation setting", "option application A" is indicated in the relevant option column. This indicates that, depending on whether the option application A 517 is installed, the reflection button necessary to activate the setting data after the setting data is changed, switches between the reboot button and the setting reflection button. A flow of a setting data change using these pieces of information in the setting value reflection button DB 530 will be described in detail below.

Figure 7:
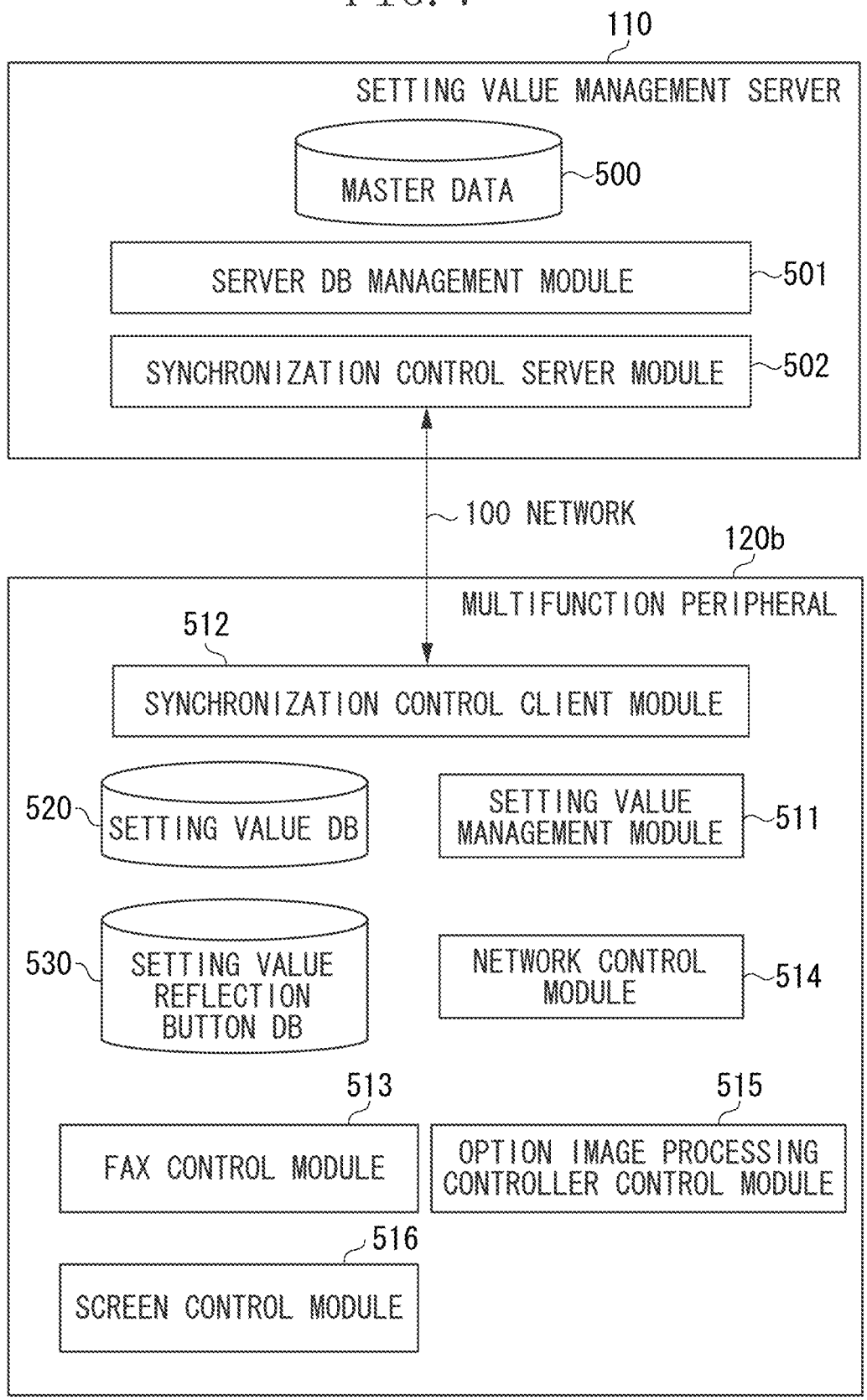
FIG. 7 is a diagram illustrating a software module configuration in a management system.

FIG. 7 is a diagram illustrating an example of a software module configuration in the management system of the present exemplary embodiment. A software module configuration of the setting value management server 110 and the multifunction peripheral 120b in the present exemplary embodiment will be described below.

In FIG. 7, the option application A 517 is not installed, which is different from the multifunction peripheral 120a illustrated in FIG. 5. In this configuration, a function provided by this option application is not available in the multifunction peripheral 120b.

Figure 8:
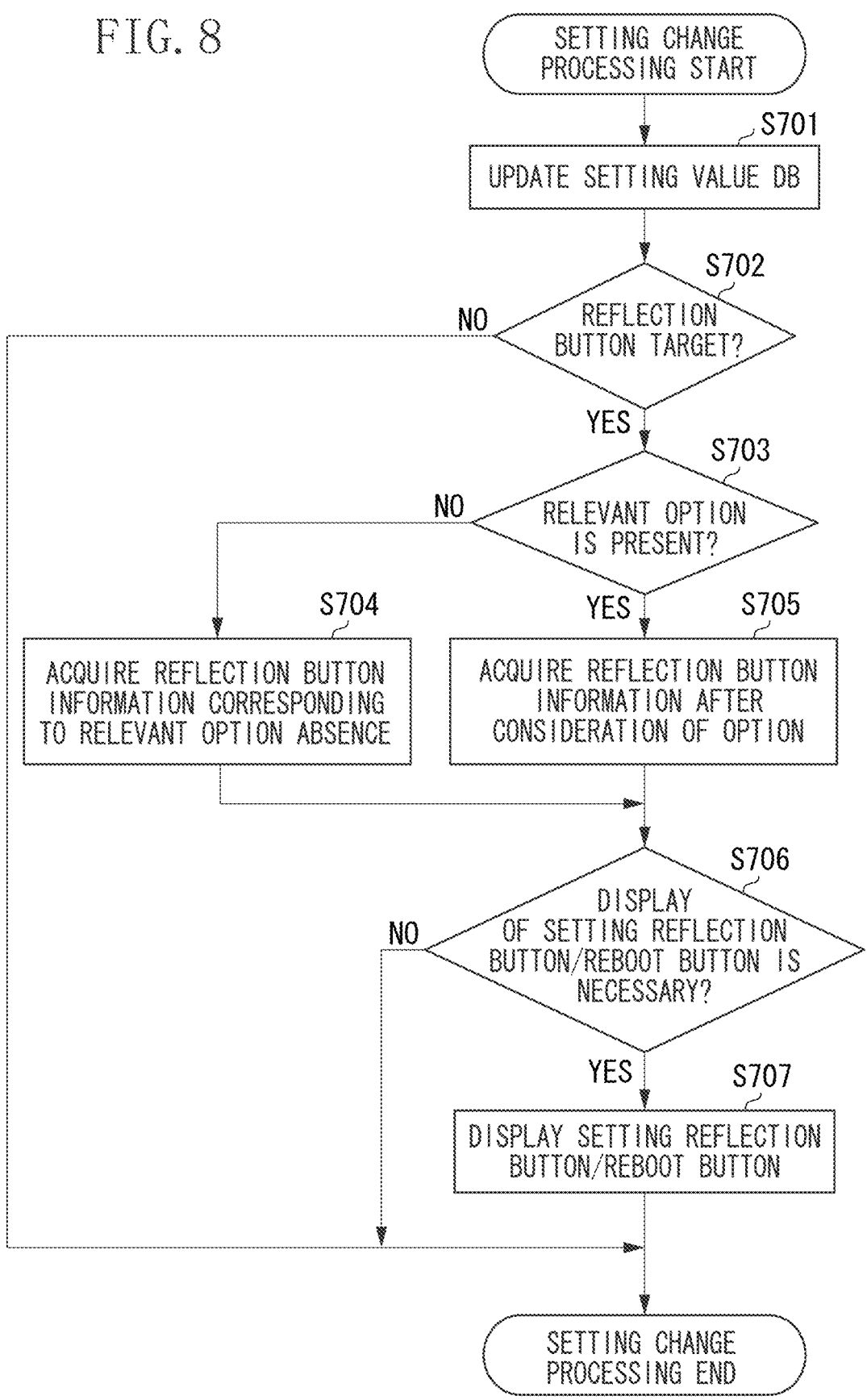
FIG. 8 is a flow chart illustrating a control method for an information processing apparatus.

FIG. 8 is a flow chart illustrating a control method for the information processing apparatus in the present exemplary embodiment. This is an example of setting value change processing performed in each of the multifunction peripheral 120a and the multifunction peripheral 120b illustrated in FIG. 1. Steps S701 to S707 each represent a processing step. A control procedure corresponding to each step is stored in any of the RAM 303, the HDD 305, and the ROM 306 in each of the multifunction peripheral 120a and the multifunction peripheral 120b. The CPU 302 executes the control procedure. The following description will be provided assuming that the modules illustrated in FIG. 5 perform the processing.

In step S701, upon receiving setting data update operation performed by a user via the operation unit 320 or the setting value management server 110, the setting value management module 511 updates the setting data managed in the setting value DB 520. Next, in step S702, the setting value management module 511 determines whether the updated setting data is a reflection button target, based on the information in the setting value reflection button DB 530.

If the setting value management module 511 determines that the updated setting data is a reflection button target (Yes in step S702), the processing proceeds to step S703. If the setting value management module 511 determines that the updated setting data is not a reflection target (No in step S702), the processing is terminated. In step S703, the setting value management module 511 determines whether there is option information relevant to the changed setting data, based on the information in the setting value reflection button DB 530.

If the setting value management module 511 determines that there is no relevant option (No in step S703), the processing proceeds to step S704. Then in step S704, the reflection button information corresponding to the relevant option absence is acquired. On the other hand, if the setting value management module 511 determines that there is relevant option information (Yes in step S703), the processing proceeds to step S705. Then in step S705, the reflection button information after consideration of the option is acquired based on determination as to whether the relevant option is provided in the multifunction peripheral 120a. There are three kinds of the reflection button information acquired in step S705, which are the reboot button, the setting reflection button, and the reflection button unnecessary, as represented by the information indicating the reflection button target illustrated in FIG. 6B.

In step S706, the setting value management module 511 confirms the reflection button information acquired in step S704 or S705, and determines whether the reflection button is necessary. Here, if it is determined that the reflection button is not necessary (No in step S706), the setting value change processing is terminated. If it is determined that the reflection button is necessary (Yes in step S706), the processing proceeds to step S707. In step S707, the screen control module 516 displays the reboot button or the setting reflection button on the operation unit 320, based on the reflection button information acquired in step S704 or S705. FIG. 10B is an example in which the reboot button BT2 is displayed on the operation unit 320.

If the operation unit 320 accepts a press of the reboot button BT2 by the user, processing for activating the change in the setting data is additionally performed by rebooting the multifunction peripheral 120a. If a press of the setting reflection button BT1 by the user is accepted, the relevant module and hardware are notified of the change in the setting data in the setting value DB 520, so that the setting change is reflected in the control of the multifunction peripheral 120, without execution of reboot. This can reduce unnecessary reboot, and can perform control with no downtime.

Next, processing performed in a case where the remote operation setting of the multifunction peripheral 120a is changed will be described in association with the flow chart of FIG. 8.

The remote operation setting is a reflection button target, and the option application A 517 is installed as a relevant option. Therefore, it is determined that there is option information in step S703 (Yes in step S703). In step S705, the reflection button information of "reboot button" is acquired from the relevant option presence column, corresponding to the remote operation setting in the setting value reflection button information illustrated in FIG. 6B.

In step S706, it is determined that operation on the reboot button BT2 is necessary (Yes in step S706), and then, in step S707, the reboot button BT2 is displayed. The option application A 517 refers to the remote operation setting when the multifunction peripheral 120a is rebooted, and then changes behavior according to the remote operation setting. Therefore, to activate the setting change, the reboot is necessary (see FIG. 6B). Accordingly, the reboot button BT2 is displayed on the panel of the operation unit 320 to prompt the user to reboot the multifunction peripheral 120a. The flow of the setting value change processing illustrated in FIG. 8 is also applicable to the multifunction peripheral 120b.

Next, an operation performed in the multifunction peripheral 120b when the DHCP setting is changed in the flow of FIG. 8 will be described in association with the flow chart illustrated in FIG. 8.

In step S701, if the value of the DHCP setting is changed from "OFF" to "ON", the setting value management module 511 updates the setting data managed in the setting value DB 520.

According to setting value information illustrated in FIG. 6A, the value of the DHCP setting is updated when changed from "OFF" to "ON". Next, in step S702, it is determined whether the updated setting data is a reflection button target based on the information in the setting value reflection button DB 530. The setting value management module 511 acknowledges that the DHCP setting is a reflection button target according to the information of the setting value reflection button DB 530 illustrated in FIG. 6B (Yes in step S702). Next, in step S703, it is determined whether there is option information relevant to the updated setting data, based on the information in the setting value reflection button DB 530.

The relevant option of the DHCP setting is "option image processing controller", according to the information of the reflection button target illustrated in FIG. 6B. The option image processing controller 360 is not attached to the multifunction peripheral 120b, and therefore, it is determined that there is no relevant option (No in step S703). In step S704, since there is no relevant option, "setting reflection button", which is the reflection button information corresponding to the relevant option absence, is acquired according to the information of the setting value reflection button DB 530 illustrated in FIG. 6B. Next, in step S706, it is confirmed that the reflection button information does not indicate "reflection button unnecessary" (Yes in step S706). In step S707, the setting reflection button BT1, which corresponds to the reflection button information of "setting reflection button", is displayed on the operation unit 320.

As described above, if the setting information held by the information processing apparatus is updated by using the received setting information, it is determined whether to produce display on the display unit 230 to prompt execution of the reboot processing, which causes the update of the setting information to be reflected in the information processing apparatus, and the display on the display unit 230 is controlled, based on the type of the updated setting information and the configuration information of the information processing apparatus.

FIG. 10A is a display example in which, in the multifunction peripheral 120b, the setting reflection button BT1 is displayed on the operation unit 320 after the DHCP setting is changed. As illustrated in the flow of FIG. 8, display of an unnecessary button can be omitted, by controlling button display for reflecting the setting, while taking into consideration the presence/absence of the relevant option for each piece of the setting data. Therefore, an effect of reducing unnecessary downtime for a user is achieved. In the present exemplary embodiment, the case where there is only one relevant option for a setting data item is described. However, the present invention is applicable to an information processing apparatus having a plurality of relevant options. Moreover, the present invention is also applicable to an information processing apparatus having a number of kinds of reflection buttons that each triggers reflection of a setting change.

According to the above-described exemplary embodiment, it is possible to complete setting reflection processing while suppressing unnecessary reboot processing, by switching reflection processing on a setting data change request according to an option configuration and ability of the information processing apparatus.

Figure 9:
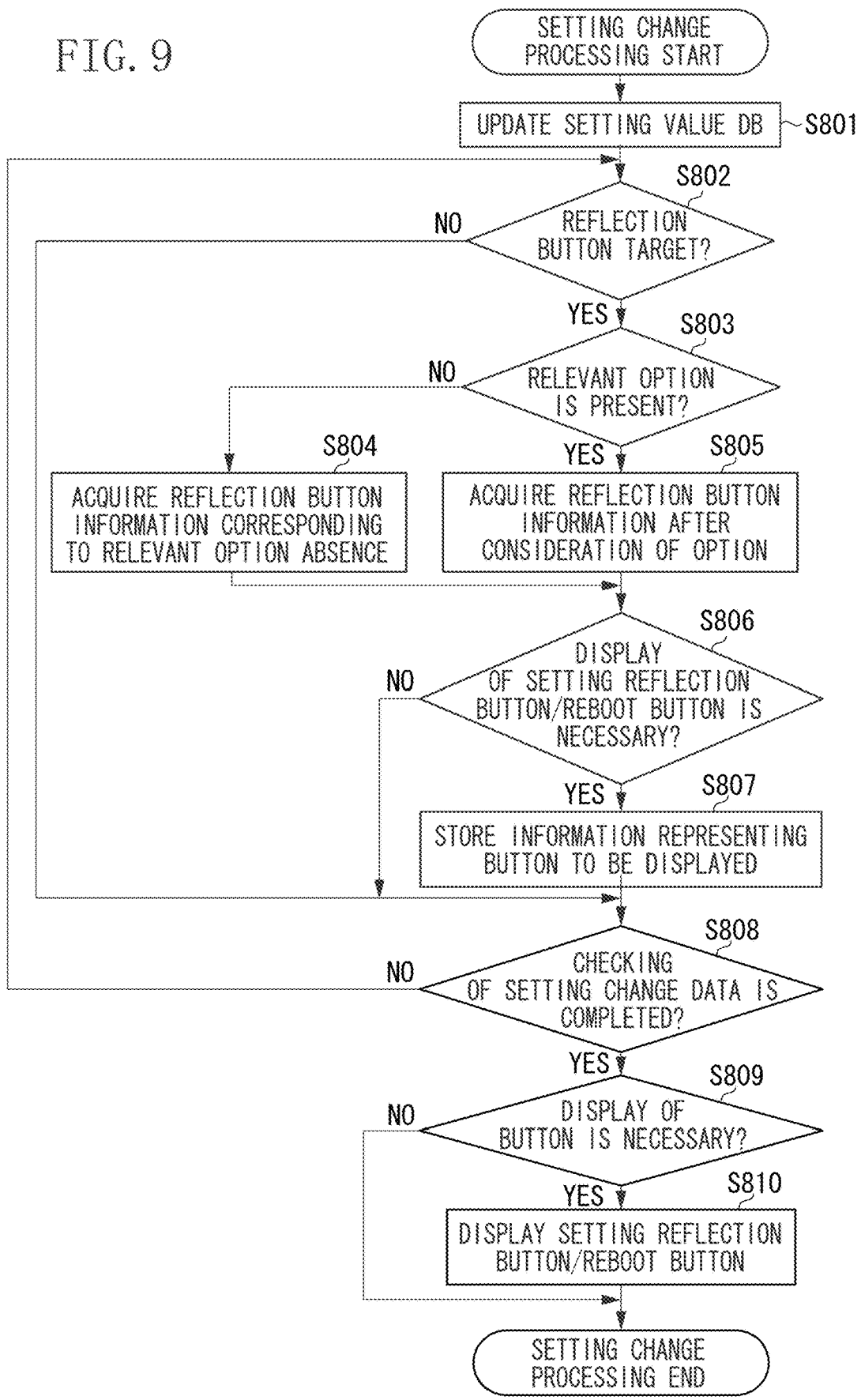
FIG. 9 is a flow chart illustrating a control method for an information processing apparatus.

Next, a second exemplary embodiment will be described. FIG. 9 is a flow chart illustrating a control method for an information processing apparatus in the present exemplary embodiment. This is an example of processing for changing a plurality of setting values at a time in each of the multifunction peripheral 120a and the multifunction peripheral 120b illustrated in FIG. 1. Steps S801 to S810 each represent a processing step. A control procedure corresponding to each step is stored in any of the RAM 303, the HDD 305, and the ROM 306 in the multifunction peripheral 120a and the multifunction peripheral 120b. The CPU 302 executes the control procedure.

In step S801, for example, if a plurality of setting data is changed, by performing synchronization control for setting data between the master data 500 on the setting value management server 110 and the setting value DB 520, the setting value management module 511 collectively updates setting data managed in the setting value DB 520. In step S802, the setting value management module 511 determines whether each piece of the updated setting data is a reflection button target based on the information in the setting value reflection button DB 530.

Here, if the setting value management module 511 determines that the updated setting data is a reflection button target (Yes in step S802), the processing proceeds to step S803. In step S803, the setting value management module 511 determines whether there is option information relevant to the changed setting data based on the information in the setting value reflection button DB 530.

If it is determined that there is no relevant option (No in step S803), the processing proceeds to step S804. Then in step S804, the reflection button information corresponding to the relevant option absence is acquired. On the other hand, if it is determined that there is relevant option information (Yes in step S803), the processing proceeds to step S805. Then in step S805, it is confirmed that the relevant option is provided in the multifunction peripheral 120a, and then the reflection button information corresponding to the presence or absence of the relevant option is acquired.

In step S806, it is determined whether the reflection button information indicates that the reflection button is necessary. If it is determined that the reflection button information indicates that the refection button is necessary (Yes in step S806), the processing proceeds to step S807. If it is determined that the reflection button information indicates that the refection button is not necessary (No in step S806), the processing proceeds to step S808. In step S807, the reflection button information is stored. After that, the above-described processes from step S802 to step S807 are repeated for all pieces of the changed setting data. In step S808, it is determined whether checking for all pieces of the changed data is completed. If the checking has been completed (Yes in step S808), the processing proceeds to step S809. On the other hand, the checking has not been completed (No in step S808), the processing returns to step S802. In step S809, it is determined whether there is reflection button information stored in step S807.

If the pieces of the changed setting data include at least one piece of data indicating that display of the reflection button is necessary, it is determined that display of the reflection button is necessary (Yes in step S809), and the processing proceeds to step S810. On the other hand, if it is determined that display of the reflection button is not necessary (No in step S809), the processing is terminated. In step S810, the reflection button is displayed. If the reflection button information includes "reboot button", priority is given to display of the reboot button. If no "reboot button" is included, the setting reflection button BT1 is automatically displayed on the operation unit 320. By displaying the reflection button only once for a plurality of changed setting data as illustrated in the flow of FIG. 9, a frequency of requesting a user to press the button can be reduced, and the length of a time for performing setting data reflection processing can also be reduced. Therefore, a plurality of setting values can be effectively changed. In this example, the multifunction peripheral 120 can reflect changes in the setting values by one reboot.

Figure 11:
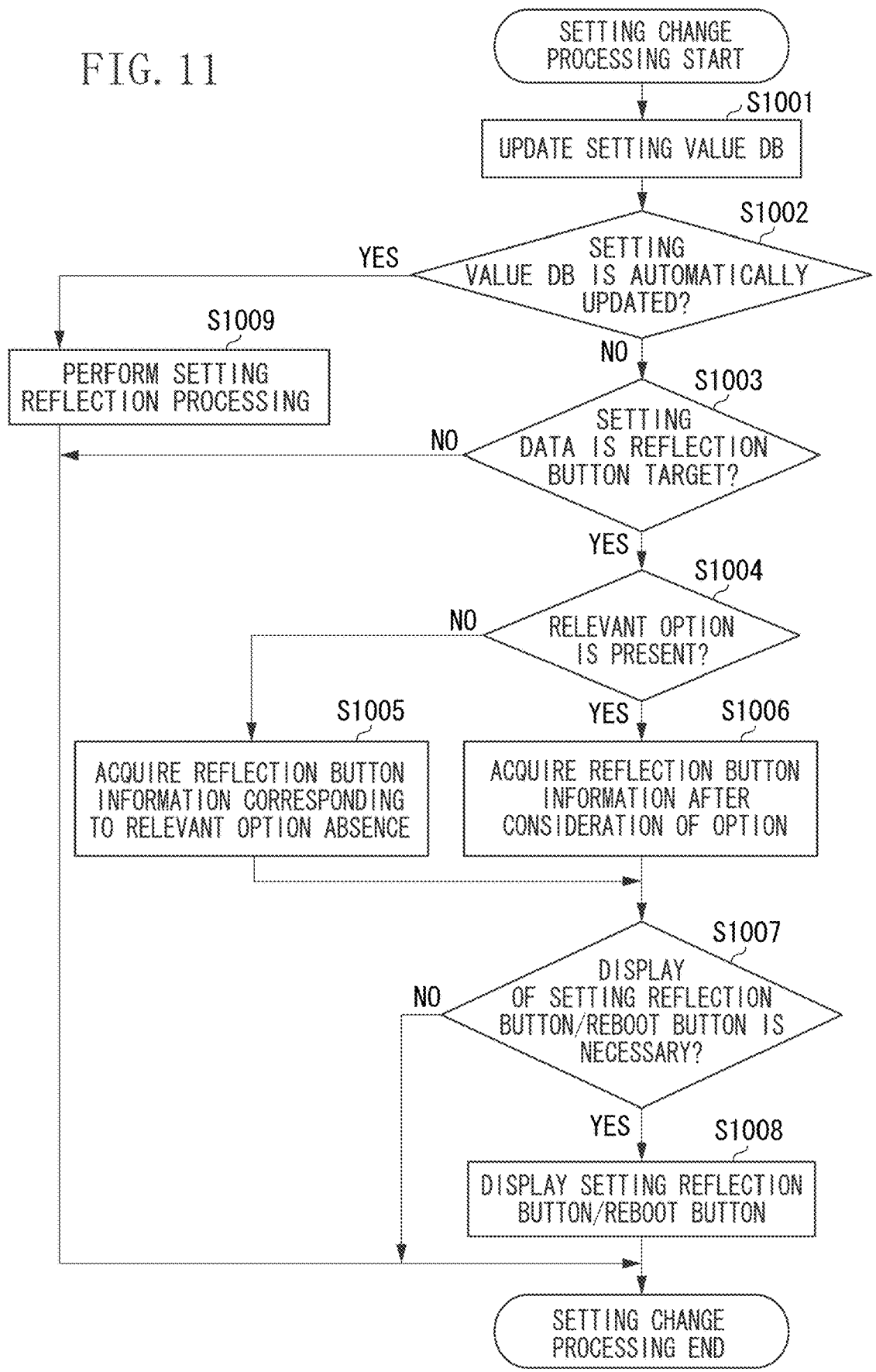
FIG. 11 is a flow chart illustrating a control method for an information processing apparatus.

Next, a third exemplary embodiment will be described. FIG. 11 is a flow chart illustrating a control method for an information processing apparatus in the present exemplary embodiment. This is an example of setting value change processing in the multifunction peripheral 120a and the multifunction peripheral 120b illustrated in FIG. 1. Steps S1001 to S1009 each represent a processing step. A control procedure corresponding to each step is stored in a storage unit that is any of the RAM 303, the HDD 305, and the ROM 306 in the multifunction peripheral 120a and the multifunction peripheral 120b. The CPU 302 executes the control procedure.

Steps S1003 to S1008 are similar to steps S702 to S707 in FIG. 8, respectively. A point different from the flow of the setting value change processing illustrated in FIG. 8 is that a factor, which updates the setting value DB after a change in the setting value DB in step S1001, is determined in step S1002. Here, the factor updating the setting value DB is an automatic update of the IP address setting without intervention of operation performed by a user, like automatic allocation of the IP address setting by DHCP or AutoIP. In this case (Yes in step S1002), the processing proceeds to step S1009, without proceeding to step S1003 in which whether the changed setting data is a reflection button target is determined. Then in step S1009, setting reflection processing is automatically performed.

In a case where the IP address setting of the multifunction peripheral 120 is automatically changed by an instruction from an DHCP server, the user may fail to notice display of the reflection button unlike in a case where the IP address is changed by operation of the user. In this case, an idle time may result before the setting data is activated. Step S1002 is provided to prevent such an idle time.

Figure 12:
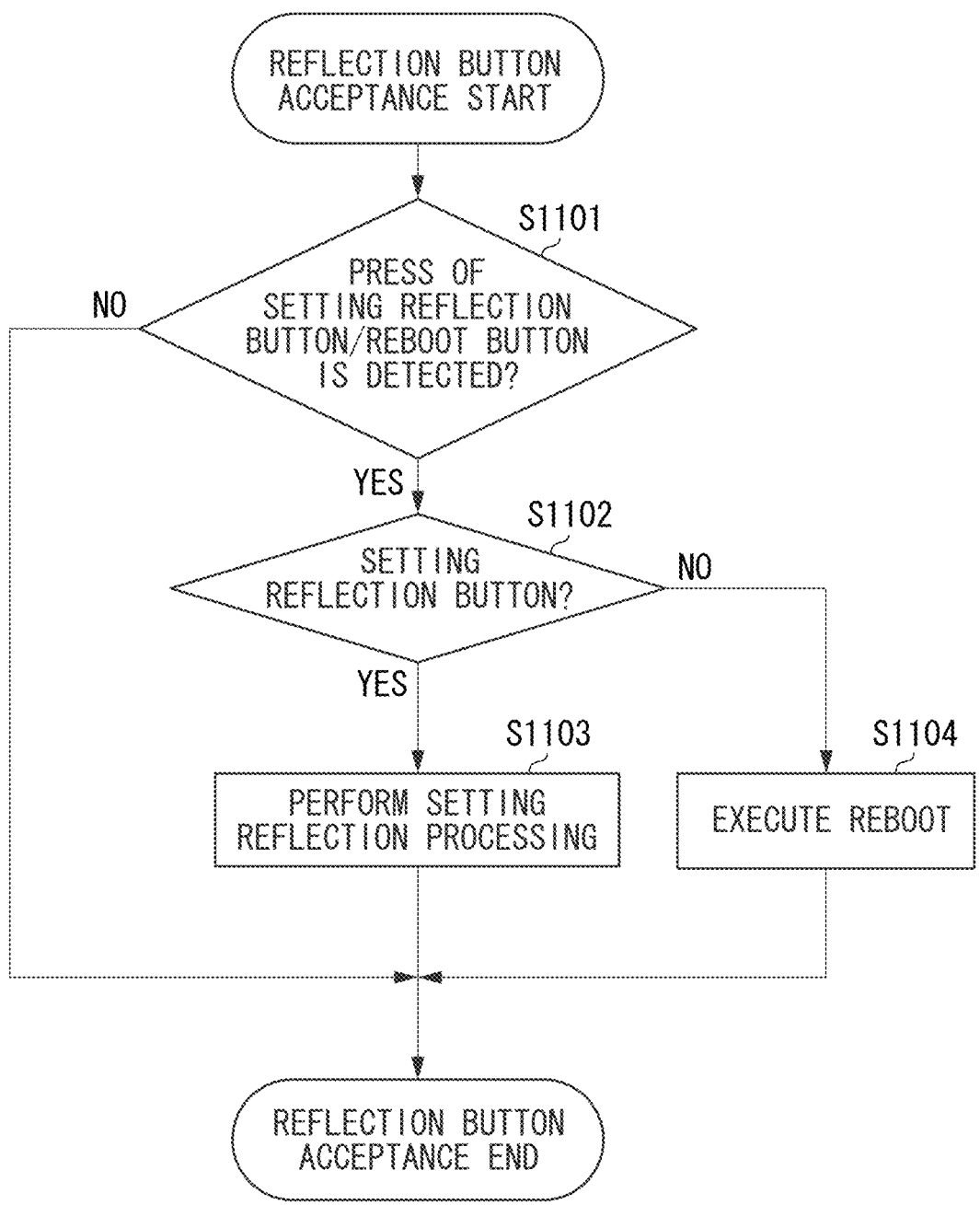
FIG. 12 is a flow chart illustrating a control method for an information processing apparatus.

FIG. 12 is a flow chart illustrating a control method for the information processing apparatus in the present exemplary embodiment. This is an example of setting change processing in the multifunction peripheral 120a. Steps S1101 to S1104 each represent a step for the processing. A control procedure corresponding to each step is stored in a storage unit that is any of the RAM 303, the HDD 305, and the ROM 306 of the multifunction peripheral 120a. The CPU 302 executes the control procedure.

In step S1101, the screen control module 516 determines whether a press of the reboot button BT2 or the setting reflection button BT1 displayed on the operation unit 320 is detected. If the screen control module 516 determines that the press of either of these buttons is detected (Yes in step S1101), the processing proceeds to step S1102. If the screen control module 516 determines that the press of either of these buttons is not detected (No in step S1101), the processing is terminated. In step S1102, the screen control module 516 determines whether the pressed button is the setting reflection button BT1. If the screen control module 516 determines that the pressed button is the setting reflection button BT1 (Yes in step S1102), the processing proceeds to step S1103. In step S1103, the screen control module 516 notifies each module and application such as the network control module 514, of the change made in the setting data in the setting value DB 520, and each module and application performs processing for reflecting the change in the setting data to the actual control of the multifunction peripheral 120a.

On the other hand, if the screen control module 516 determines that the pressed button is the reboot button BT2 (No in step S1102), the processing proceeds to step S1104. Then in step S1104, the system of the multifunction peripheral 120a is rebooted. The multifunction peripherals 120a and 120b in the present exemplary embodiment are each configured to reflect all changes made in the setting data in the setting value DB 520, upon reboot of the system.

The present invention is also achievable by such processing that a program that implements one or more functions of the above-described exemplary embodiments is supplied to a system or apparatus via a network or storage medium, and one or more processors in the system or apparatus read the program and then execute the read program. Moreover, the present invention is also achievable by a circuit (e.g., an application-specific integrated circuit (ASIC)) that implements one or more functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:
1. An information processing apparatus communicable with a server configured to hold setting values of various setting items usable in the information processing apparatus, to which an accessory device is detached or attached, the information processing apparatus comprising:
   a display that displays information; and
   one or more controllers configured to:
   acquire the setting values of the various setting items from the server via a network,
   in a case where at least one setting value of a setting item that requires a reboot of the information processing apparatus to reflect on an operation of the information processing apparatus, among the acquired setting values, is included, perform a display process of displaying a confirm button enabling a user to confirm a reboot of the information processing apparatus on the display, and perform a reflection process including a reboot process, in response to selection of the confirm button, and in a case where a setting value of a setting item that requires a reboot of the information processing apparatus to reflect on an operation of the information processing apparatus, among the acquired setting values, is only a setting value of a predetermined setting item related to the accessory device, and the accessory device is not attached, perform a reflection process not including a reboot process without performing the display process.

2. The information processing apparatus according to claim 1, wherein the one or more controllers does not allow execution of a process using the acquired setting value of the predetermined item until the confirm button is selected, and allows the execution of the process using the acquired setting value of the predetermined item after the confirm button is selected.

3. The information processing apparatus according to claim 1, wherein the one or more controllers notifies the accessory device of the update of the predetermined item based on the selection of the confirm button.

4. The information processing apparatus according to claim 1,
wherein another accessory device different from the accessory device is also detached or attached to the information processing apparatus, and
wherein the one or more controllers notifies the accessory device of the update of the predetermined item based on the selection of the confirm button and notifies the different accessory device of an update of an item different from the predetermined item.

5. The information processing apparatus according to claim 1, wherein the one or more controllers reboots the information processing apparatus based on the selection of the confirm button.

6. The information processing apparatus according to claim 1, wherein the confirm button has information indicating setting reflection.

7. The information processing apparatus according to claim 1, wherein the confirm button has information indicating rebooting.

8. The information processing apparatus according to claim 1, wherein the acquired data includes at least an item not requiring a selection of the confirm button by a user, an item requiring a selection of the confirm button by a user, or an item requiring a selection of the confirm button by a user and rebooting of the information processing apparatus.

9. The information processing apparatus according to claim 1,
wherein another accessory device different from the accessory device is also detached or attached to the one or more controllers, and
wherein the predetermined item is an item related to the different accessory device.

10. The information processing apparatus according to claim 1, wherein the accessory device is a modem.

11. The information processing apparatus according to claim 1, wherein the accessory device is a scanner.

12. The information processing apparatus according to claim 1, wherein the accessory device is a controller.

13. A non-transitory computer-readable storage medium storing computer-executable instructions for causing a computer to execute a method of controlling an information processing apparatus communicable with a server configured to hold setting values of various setting items usable in the information processing apparatus, to which a accessory device is attachable, and which has a display that displays information, the method comprising:
acquiring the setting values of the various setting items from the server via a network, and
in a case where at least one setting value of a setting item that requires a reboot of the information processing apparatus to reflect on an operation of the information processing apparatus, among the acquired setting values, is included, performing a display process of displaying a confirm button enabling a user to confirm a reboot of the information processing apparatus on the display, and performing a reflection process including a reboot process, in response to selection of the confirm button, and
in a case where a setting value of a setting item that requires a reboot of the information processing apparatus to reflect on an operation of the information processing apparatus, among the acquired setting values, is only a setting value of a predetermined setting item related to the accessory device, and the accessory device is not attached, performing a reflection process not including a reboot process without performing the display process.

14. An information processing apparatus communicable with a server configured to hold setting values of various setting items usable in the information processing apparatus, to which a predetermined application is able to be installed, the information processing apparatus comprising:
a display that displays information; and
one or more controllers configured to:
acquire the setting values of the various setting items from the server via a network,
in a case where the at least one setting value of a setting item that requires a reboot of the information processing apparatus to reflect on an operation of the information processing apparatus, among the acquired setting values, is included, perform a display process of displaying a confirm button enabling a user to confirm a reboot of the information processing apparatus on the display, and perform a reflection process including a reboot process, in response to selection of the confirm button, and
in a case where a setting value of a setting item that requires a reboot of the information processing apparatus to reflect on an operation of the information processing apparatus, among the acquired setting values, is only a setting value of a predetermined setting item related to the predetermined application, and predetermined application is not installed, perform a reflection process not including a reboot process without performing the display process.

15. The information processing apparatus according to claim 14, wherein the one or more controllers does not allow execution of process using the acquired setting value of the predetermined item until the confirm button is selected, and allows the execution of the process using the acquired setting value of the predetermined item after the confirm button is selected.

16. The information processing apparatus according to claim 14, wherein the one or more controllers notifies the predetermined application of the update of the predetermined item based on the selection of the confirm button.

17. The information processing apparatus according to claim 14,
wherein an application different from the predetermined application is able to be installed, and wherein the one or more controllers notifies the predetermined application of the update of the predetermined item based on the selection of the confirm button and notifies the different application of an update of an item different from the predetermined item.

18. The information processing apparatus according to claim 14, wherein the one or more controllers reboots the information processing apparatus based on the selection of the confirm button.

19. The information processing apparatus according to claim 14, wherein the confirm button has information indicating setting reflection.

20. The information processing apparatus according to claim 14, wherein the confirm button has information indicating rebooting.

21. The information processing apparatus according to claim 14, wherein the acquired data includes at least an item not requiring a selection of the confirm button by a user, an item requiring a selection of the confirm button by a user, or an item requiring a selection of the confirm button by a user and rebooting of the information processing apparatus.

22. The information processing apparatus according to claim 14,
wherein an application different from the predetermined application is able to be installed, and
wherein the predetermined item is an item related to the different application.

23. A method of controlling an information processing apparatus communicating with a server configured to hold setting values of various setting items usable in the information processing apparatus, the information processing apparatus including a storage that a predetermined application is able to be installed, and a display that displays information, the method comprising:
acquiring the setting values of the various setting items from a server via a network,
in a case where at least one setting value of a setting item that requires a reboot of the information processing apparatus to reflect on an operation of the information processing apparatus, among the acquired setting values, is included, performing a display process of displaying a confirm button enabling a user to confirm a reboot of the information processing apparatus on the display, and performing a reflection process including a reboot process, in response to selection of the confirm button, and
in a case where a setting value of a setting item that requires a reboot of the information processing apparatus to reflect on an operation of the information processing apparatus, among the acquired setting values, is only a setting value of a predetermined setting item related to the predetermined application, and the predetermined application is not installed, performing a reflection process not including a reboot process without performing the display process.

24. A non-transitory computer-readable storage medium storing computer-executable instructions for causing a computer to execute a control method of an information processing apparatus communicable with a server configured to hold setting values of various setting items usable in the information processing apparatus, the information processing apparatus has a storage that a predetermined application is able to be installed, which is able to store a setting value of a predetermined item related to the predetermined application in a storage area, and a display that displays information, the method comprising:
acquiring the setting values of the various setting items from a server via a network,
in a case where one setting value of a setting item that requires a reboot of the information processing apparatus to reflect on an operation of the information processing apparatus, among the acquired setting values, is included, performing a display process of displaying a confirm button enabling a user to confirm a reboot of the information processing apparatus on the display, and performing a reflection process including a reboot process, in response to selection of the confirm button, and
in a case where a setting value of a setting item that requires a reboot of the information processing apparatus to reflect on an operation of the information processing apparatus, among the acquired setting values, is only a setting value of a predetermined setting item related to the predetermined application, and the predetermined application is not installed, performing a reflection process not including a reboot process without performing the display process.

* * * * *